(12) United States Patent
Wehrspohn et al.

(10) Patent No.: US 8,480,941 B2
(45) Date of Patent: Jul. 9, 2013

(54) METHOD FOR PRODUCING A 3-DIMENSIONAL MOLDED BODY COMPRISING POLYMER-CONTAINING MATERIAL AND A METHOD FOR PRODUCING AN ADHESIVE BOND BETWEEN A POLYMER-CONTAINING MATERIAL AND A THREE-DIMENSIONAL MOLDED BODY

(75) Inventors: Ralf Wehrspohn, Halle (DE); Martin Steinhart, Halle (DE)

(73) Assignees: Fraunhofer-Gesellschaft zur Förderung der angewandten Forschung e.V., München (DE); Max-Planck-Gesellschaft zur Förderung der Wissenschaften e.V., München (DE)

( * ) Notice: Subject to any disclaimer, the term of this patent is extended or adjusted under 35 U.S.C. 154(b) by 155 days.

(21) Appl. No.: 12/879,492

(22) Filed: Sep. 10, 2010

(65) Prior Publication Data

US 2011/0059310 A1 Mar. 10, 2011

Related U.S. Application Data

(63) Continuation-in-part of application No. PCT/DE2009/000306, filed on Mar. 3, 2009.

(30) Foreign Application Priority Data

Mar. 13, 2008 (DE) .......................... 10-2008-014119

(51) Int. Cl.
*B29C 41/02* (2006.01)
(52) U.S. Cl.
USPC .......................................... 264/273; 264/274

(58) Field of Classification Search
None
See application file for complete search history.

(56) References Cited

U.S. PATENT DOCUMENTS

| | | | |
|---|---|---|---|
| 4,740,340 A * | 4/1988 | Pratt et al. .................. | 264/127 |
| 4,865,778 A | 9/1989 | Leidel | |
| 5,158,680 A * | 10/1992 | Kawai et al. .............. | 210/321.61 |
| 5,487,825 A | 1/1996 | Kurze et al. | |
| 5,846,359 A | 12/1998 | Ota et al. | |
| 6,042,778 A * | 3/2000 | Kraft et al. .................. | 419/27 |
| 2008/0053959 A1 | 3/2008 | Tong et al. | |

FOREIGN PATENT DOCUMENTS

| | | |
|---|---|---|
| CH | 690 174 A5 | 5/2000 |
| DE | 132426 | 9/1978 |
| DE | 101 46 324 A1 | 4/2003 |
| EP | 0 726 461 B1 | 8/1996 |
| EP | 1 688 175 A1 | 8/2006 |
| WO | WO 2007/029440 A1 | 3/2007 |

\* cited by examiner

*Primary Examiner* — Edmund H. Lee
(74) *Attorney, Agent, or Firm* — Antonelli, Terry, Stout & Kraus, LLP.

(57) ABSTRACT

A three-dimensional molded body, a method for producing a three-dimensional molded body and a method for producing an adhesive bond between a polymer-containing material and a molded body having an inorganic porous framework structure in at least partial areas are described. In all cases the porous structure of the molded body comprising inorganic material is brought in contact with a polymer-containing material which is heated until the heated material enters into a joint connection with the molded body based on adhesive interactions, interfacial interactions, electrostatic interactions or any combination thereof, in which the pore-like voids of the porous structure are filled completely with the polymer-containing material, which stabilizes the molded body so that it has dimensional stability after cooling.

25 Claims, No Drawings

METHOD FOR PRODUCING A 3-DIMENSIONAL MOLDED BODY COMPRISING POLYMER-CONTAINING MATERIAL AND A METHOD FOR PRODUCING AN ADHESIVE BOND BETWEEN A POLYMER-CONTAINING MATERIAL AND A THREE-DIMENSIONAL MOLDED BODY

CROSS-REFERENCE TO RELATED APPLICATION

This application claims the priority of and is a Continuation-In-Part of PCT Application Ser. No. PCT/DE2009/000306, filed on Mar. 3, 2009, entitled "Method for Producing a 3-Dimensional Molded Body Comprising Polymer-Containing Material and a Method for Producing an Adhesive Bond Between a Polymer-Containing Material and a Three-Dimensional Molded Body, which application is incorporated herein by reference in its entirety.

BACKGROUND OF THE INVENTION

1. Field of the Invention

The invention relates to a three-dimensional molded body and a method for producing an adhesive bond between a polymer-containing material and a three-dimensional molded body having an inorganic porous surface structure.

2. Description of the Prior Art

Molded bodies primarily of polymer-containing materials are produced by flow processes, pressing and/or sintering processes by known methods. Conventional shaping methods include thermoplastic processing of liquid polymer-containing materials. However, these methods require that the materials to be processed have a sufficiently low melt viscosity. Although the melt viscosity of some polymer-containing materials can be reduced by high process temperatures to such an extent that thermoplastic shaping is possible, the technical complexity required for such process temperatures is much higher than that for lower process temperatures. Furthermore, the polymer-containing material may decompose at least partially at high process temperatures, and the greater temperature difference which is to be overcome in cooling from high process temperatures to room temperature in comparison with lower process temperatures leads to greater volume shrinkage. Important materials having advantageous properties, for example, polymers having a high degree of polymerization, such as that often exhibited by polytetrafluoroethylene or polyethylenes or microphase-separated block copolymers cannot be processed thermoplastically because of their high melt viscosity at all temperatures at which these materials do not decompose at least partially to a substantial extent.

Some attempts to solve these problems have been made such as use of essentially known sintering methods for production of molded PTFE bodies. These usually include the introduction of small particles of the material to be shaped into a mold and partial bonding of these particles by subsequent heating. Sintering methods are associated with great changes in volume which is a circumstance which raises problems associated with manufacturing, in manufacturing precision parts, such as to produce medical implants. The molded parts obtained by this method are usually porous and have only unsatisfactory mechanical properties.

Another strategy for producing molded parts of materials that cannot be processed thermoplastically is to use machining techniques in which material is mechanically removed from a monolith until the desired molded part is obtained. Such machining techniques are naturally associated with a substantial amount of reject material machined off of the molded part, which in turn raises disposal problems, while on the other hand being a disadvantage economically, in particular in the shaping of expensive high-performance polymers.

The processing of polymer solutions by so-called flow processes offers only limited possibilities for production of molded parts having mechanical stability because other problems are associated with this process technology. For example, large quantities of organic solvents are required to convert polymer components to a soft or dissolved state in which further processing is possible, but these organic solvents are usually toxic as well as being extremely problematical environmental pollutants, ultimately leading to disposal problems that cannot be disregarded. Furthermore, physical phenomena that are technically difficult to handle, such as phase separation, hydrodynamic instabilities or the like, occur during processing of polymer solutions due to evaporation of the solvent, and these phenomena can have a permanent and virtually uncontrollable influence on the properties of the molded parts and coatings produced by the flow process technology. In this context, the uncontrolled development of cavities, voids and pores in the molded parts comprised of polymer materials can be mentioned as typical phenomena in this context. Dissolving of polymer-containing materials in solvents often takes much longer than dissolving materials having a low molecular weight. Furthermore, the solubility of polymers in solvents is often very low. For many polymer-containing materials having advantageous properties such as polymers having a high molecular weight such as PE, the dissolving rate in all solvents and the solubility are so low that industrial processing of polymer solutions is almost impossible in these cases. There are no known suitable solvents for many other polymer-containing materials having advantageous properties such as PTFE.

In addition, no composite materials with polymer-containing materials, which cannot be processed thermoplastically, can be produced by the methods described above. This would be advantageous because, on the one hand, due to the inexpensive filler, the corresponding amount by volume of expensive high-performance polymers could be eliminated, for example, while on the other hand the properties of the polymer-containing material could be advantageously modified in a composite.

In addition to the production-related problems mentioned above, molded parts containing fluorinated polymers in particular, for example, molded parts made of PTFE are subject to so-called cold flow in which a gradual change in shape of the respective molded body occurs due to creep phenomena even at room temperature.

Furthermore, reference is made to two publications which describe methods by which pores or cavities within a porous matrix structure are filled with another substance. For example, DD 132 426 A describes a method for rapid impregnation of dry or moist finished parts comprised of porous construction materials, preferably based on concrete or plaster. To do so, an impregnating agent in solid form, for example, in the form of paraffin granules or paraffin-bitumen granules, is added to the concrete or plaster composition, which is to be provided as the starting material for production of a corresponding finished part. This composition is sent for a suitable shaping and then drying process, during which pores develop within the construction composition as it solidifies, but these pores are ultimately clogged at an elevated drying temperature by the paraffin granules and/or paraffin-bitumen granules entering into the melt. Finished parts manufactured by the technical teaching according to DD 132 426 A unavoidably have air inclusions inside the regions filled with paraffin granules and/or paraffin-bitumen granules. The method that can be derived from DD 132 426 A does not allow processing of the polymer-containing material at temperatures below the temperatures required for thermoplastic processing.

CH 690 175 A5 describes a method by which a porous layer on an object, which is not otherwise porous, is filled by solutions or suspensions containing polymers under fluctuating pressure conditions. The use of both solutions and suspensions requires a solvent whose presence makes the impregnation process technically complicated, especially since solvents must be removed from the impregnated layer and ultimately must be disposed of at great expense. Furthermore, volatile components alter the material properties of polymers in a manner that is difficult or impossible to control. Furthermore, the filling factor of the polymer within the specimens is less than 100%, so it is impossible to fill the pores completely with polymer.

SUMMARY OF THE INVENTION

The present invention avoids the disadvantages described above and in particular, provides molded bodies manufactured from polymer-containing materials produced as inexpensively as possible and with accurately defined three-dimensional shapes, which also have long-term stability. Furthermore, a method of the invention provides an adhesive bond between a polymer-containing material and a molded body, like a coating is to be made possible. At the same time, improved adhesion between an inorganic molded body and a molded body comprised of polymer-containing material is to be achieved.

The method of the invention produces a three-dimensional molded body comprising a polymer-containing material for further use as a porous framework structure of inorganic material containing pore-like cavities. The inorganic material of the framework structure may be made of metals, metal alloys, nonmetals, combinations of nonmetallic elements as well as metal-nonmetal composites. The inorganic material is preferably selected from oxides, phosphates, nitrides, mixtures of various oxides and/or phosphates and/or nitrides, semiconductor materials, amorphous carbon materials or at least partially crystalline carbon materials. According to the method of the invention, the pore-like cavities of the framework structure of an inorganic material are filled completely with a polymer-containing material, which is heated to a temperature above the solidification point and are filled at a process temperature at which the polymer-containing material cannot be processed thermoplastically. In doing so, a joint connection based on adhesive interactions, interfacial interactions, electrostatic interactions or any combination thereof is formed between the polymer-containing material and the inorganic porous framework structure of the three-dimensional molded body.

Adhesive interaction is based on van der Waals forces, acting between the organic polymer-containing material and the inorganic porous framework; interfacial interaction is based on chemical bonds, for example hydrogen bonds; and electrostatic interaction is based on the presence of electrical charges and/or permanent dipole moments in the inorganic porous framework and/or in the organic polymer-containing material.

The method of the invention is based on filling of the inorganic structure being triggered and driven by interfacial interactions, electrostatic interactions or any combination thereof between the structure and the polymer-containing material used to fill the structure. The method of the invention is thus significantly different than previously known flow processes and machining processes as well as pressing operations and sintering operations for producing molded bodies made of polymer-containing material. The method of the invention utilizes strong wetting forces, between the polymer-containing material and the porous inorganic structure, allowing the interspaces and/or cavities within the porous inorganic structure to be filled completely. The molded body that can be produced with the method of the invention thus has at least the inorganic material of which the framework structure is made as well as the polymer-containing material, which fills the framework structure or partial areas of the framework structure completely in its cavities without any air inclusions and/or which surrounds the entire framework structure at its surface. The shape of the three-dimensional molded body is defined by the inorganic framework structure, which may be made of metals, preferably platinum, palladium, copper, iron or others, metal alloys, nonmetals, combinations of nonmetallic elements and metal-nonmetal composites, preferably oxides, phosphates, nitrides, mixtures of various oxides and/or phosphates and/or nitrides, semiconductor materials, amorphous carbon materials or at least partially crystalline carbon materials and especially preferably silicon oxide, titanium oxide, aluminum oxide or boron nitride. In the case of amorphous or at least partially crystalline carbon materials, the pore surfaces may additionally have polar modifications to improve the wetting efficiency. It is not necessarily essential for all pores within the inorganic framework structure to be openly interconnected and to form so-called bicontinuous networks. Likewise, it is possible to form porous inorganic framework structures having pores which are not interconnected, such as, for example, pores in a parallel array-type configuration.

The pore diameters should typically be in the range between 1 nm and 50 μm up to at most 100 μm, and the pore content in relation to the total volume of the three-dimensional molded body should be at least 5% and preferably between 30% and 50%.

In a preferred embodiment, the porous framework structure is created by using amphiphilic structure-influencing substances, preferably surfactants, especially preferably block copolymers as the template. It is also possible to create the framework structure by spinodal separation from a substance mixture, for example, in the form of CPGs (controlled porous glasses), which will be discussed in detail in a later passage in the following text.

A three-dimensional molded body according to the present invention has a porous framework structure having pore sizes of 1 nm to 100 μm in at least partial areas, such that the pores and the framework structure have a bicontinuous morphology or there are pores in the framework structure which are not interconnected but are arranged side-by-side and in which the pores are each filled completely, without any air inclusions, with a polymer-containing material in at least partial areas of the framework structure. The polymer-containing material may have a high melt viscosity such as that which is characteristic of polymers having a high molecular weight or microphase-separated block copolymers. Nevertheless, a joint connection based on adhesive interactions, interfacial interactions, electrostatic interactions or any combination thereof develops between the polymer-containing material and the porous framework structure. Thus polymer-containing materials which cannot be processed thermoplastically, can be processed into molded parts by the method according to the present invention. The process temperature can be lowered considerably in the case of polymer-containing materials which can be processed thermoplastically only at high temperatures, which are a disadvantage in comparison with traditional processing techniques such as extrusion, injection molding, etc.

In addition to the possibility of completely filling the entire pore volume of the framework structure of the molded body with the polymer-containing material, it is also possible to completely fill only selected regions of the framework structure with the polymer-containing material. Since the polymer-containing material fills the pores based on capillary forces alone, the individual pore volumes are filled completely. However, this takes place with a very low penetration rate through the entire porous three-dimensional molded body, so that the filling process can be stopped at any time, preferably by lowering the process temperature below the solidification point of the polymer-containing material. The pores may thus be filled completely with the polymer-containing material only in partial areas of the porous three-dimensional molded body, whereas no polymer-containing material is present in other partial areas of the porous three-dimensional molded body. There are a number of advantages to the molded body obtained in this way, which is filled completely with polymer-containing material in partial areas, as well as the method for producing the same: i) lower weight than in the case of a corresponding porous three-dimensional molded body filled completely with polymer-containing material; ii) lower material costs due to the lower use of polymer-containing material; and iii) shorter manufacturing times due to partial complete filling in comparison with total complete filling.

The polymer components and/or the polymer-containing material may essentially have one or more polymer materials, which preferably have a high melt viscosity, so that they cannot be processed thermoplastically at all or they can be processed thermoplastically only at much higher temperatures than is the case with the method of the invention in combination with a porous inorganic framework structure. The polymer-containing material here completely fills up the cavities, gaps or pores in the inorganic framework structure. Polymer components such as PTFE or high-molecular polyethylenes as well as microphase-separated block polymers are especially suitable here.

Examples of polymers suitable for the method of the invention may be selected from:
i) organic polymers, such as poly(p-xylylene), polyacrylamide, polyimides, polyesters, polyolefins, polystyrenes, polycarbonates, polyamides, polyethers, polyphenylene, polysilanes, polysiloxanes, polybenzimidazoles, polybenzothiazoles, polyoxazoles, polysulfides, polyesteramides, polyarylene vinylenes, polylactides, polyether ketones, polyurethanes, polysulfones, polyacrylates, wholly aromatic copolyesters, poly-n-vinylpyrrolidone, polyhydroxyethyl methacrylate, polymethyl methacrylate, polyethylene terephthalate, polybutylene terephthalate, polymethacrylonitrile, polyvinyl acetate, neoprene, Buna N, polybutadiene, and their homopolymers or copolymers and/or blends;
ii) inorganic polymers such as polyphosphates and silicones as well as their copolymers and blends with other organic or inorganic polymers as well as organic/inorganic hybrid polymers such as Ormocers;
iii) fluorinated polymers such as polyvinylidene fluoride, polytrifluoroethylene, polytetrafluoroethylene;
vi) polyethylenes;
v) biological polymers such as polysaccharides, for example, cellulose (modified or unmodified), alginates or polypeptides, for example, collagen;
vi) polymers composed of at least two different repeating units, preferably in the form of random copolymers, block copolymers, graft copolymers, dendrimers or copolymers having fluoroethylene, difluoroethylene, trifluoroethylene or tetrafluoroethylene as comonomers; and
vii) combinations of several organic and/or biological polymers.

Such polymer materials, which have a very high melt viscosity, such as linear homopolymers or random copolymers having a high molecular weight or microphase-separated block copolymers or mixtures of at least one of the aforementioned components have several specific advantages. For example, polymers having a very high molecular weight in particular have an excellent chemical and mechanical stability. In the case of block copolymers and polymer blends, novel and unusual combinations of properties are also possible. Although these materials can be heated to temperatures at which the polymer or all polymer components soften, the melt viscosity of these materials is so high, because of their molecular weight or the presence of a microphase separation, that shaping methods such as those known in the prior art, for example, hot pressing, cannot be performed at all or can be performed only at temperatures which are so high that they are a disadvantage. The method of the invention overcomes this obvious problem by providing a method by which polymer-containing materials can be processed into molded parts through targeted use of the adhesive interactions, interfacial interactions, electrostatic interactions or any combination thereof occurring between the polymer-containing material and the surface of the porous inorganic framework structure.

Based on the invention, in contrast with the production of a three-dimensional molded body as described above, a coating of a polymer-containing material may also be applied to the inorganic porous surface structure of a molded body, such as for example a silicon wafer. As a preparatory step here, a molded body having an inorganic porous surface structure is provided or a corresponding porous structure is produced in an inorganic surface of a molded body by way of an electrochemical etching method, a lithographic etching method or a plasma etching method.

According to the production process described above for a three-dimensional molded body, in the case of coating of the molded body having an inorganic porous surface structure, at least the inorganic porous surface structure also preferably consists of metals, metal alloys, nonmetals, combinations of nonmetallic elements and metal-nonmetal composites, especially preferably oxides, phosphates, nitrides, mixtures of different oxides and/or phosphates and/or nitrides, semiconductor materials, amorphous carbon materials or at least partially crystalline carbon materials, most preferably silicon oxide, titanium oxide, aluminum oxide or boron nitride.

In addition, the polymer-containing material is applied to the inorganic porous surface structure of the molded body, for example, in the form of a polymer film. The wetting-mediated filling of the porous surface structure is typically accomplished by heat pressing, that is, the polymer-containing material is pressed against the inorganic porous surface structure by heating under pressure to form a joint connection based on adhesive, intermolecular and inter-facial interactions. In a particularly advantageous manner, PTFE is suitable as the polymer-containing material for forming a PTFE layer on the inorganic surface of the molded body. Possible examples of applications here include the coating of stents in the field of medicine as well as other medical implants. This overcomes the problem of inadequate adhesion of polymer-containing coatings to inorganic surfaces, which can be achieved only with great effort and with methods that are not an advantage.

Another very advantageous application of the inventive method involves the production of an adhesive connection between a three-dimensional molded body consisting of a polymer-containing material and a molded body having at least one inorganic porous surface structure, where the molded body having an inorganic porous surface structure need not necessarily—but may be—designed to be completely porous. The inorganic porous surface structure is a material which is preferably selected from metals, metal alloys, nonmetals, combinations of nonmetallic elements as well as metal-nonmetal composites, especially preferably oxides, phosphates, nitrides, mixtures of different oxides and/or phosphates and/or nitrides, semiconductor materials, amorphous carbon materials or at least partially crystalline carbon materials, which most preferably is silicon oxide, titanium oxide, aluminum oxide or boron nitride. For the joining operation, it is advantageously possible to heat the molded body having the inorganic porous surface structure to a temperature above the solidification point of the polymer-containing material, so that only the polymer-containing material, which is in direct contact with the porous surface structure, is heated to a temperature above the solidification point. The process temperature to which the inorganic molded body is to be heated is selected so that the polymer-containing material cannot be processed thermoplastically without coming in contact with the porous layer of the molded body of inorganic material. First, the possible process management by the method of the invention is economically advantageous at lower temperatures in comparison with processes which require higher process temperatures. On the other hand, the method of the invention provides a strong adhesive bond between a prefabricated molded body of the polymer-containing material and a molded body of an inorganic material without altering the shape of the molded body made of the polymer-containing material or its other properties.

An advantageous exemplary embodiment of the production of a three-dimensional molded body, which is at least proportionately of polymer-containing material, uses as the starting material a porous molded body made of silicon oxide, which falls under the category of controlled porous glasses, abbreviated CPG, and typically has pores with an average pore width of 2 nm to 120 nm. Such CPGs are shaped with the aid of a macroscopic casting mold, which is filled completely with a softened glass mixture. The glass mixture typically has 50% to 70% silicon oxide, 1% to 10% sodium oxide and proportional amounts of boron oxide ($B_2O_3$). By means of controlled temperature regulation, the elements involved undergo phase separation, with separation of boron oxide, among other substances, and its extraction from the glass composite by an after-treatment with acidic solutions. Ultimately a vitreous framework structure having a porosity between 50% and 75% is obtained.

Depending on the shape, size and properties of the freely accessible surfaces within the CPG framework structure, the quantity of polymer-containing material, preferably PTFE, is calculated and applied to the surface of the vitreous framework structure at a process temperature of approx. 400° C. Application of PTFE to and/or into the porous framework structure may be accomplished in various ways, for example, by applying PTFE powder, PTFE granules, PTFE chips or PTFE films. The PTFE may optionally be pressed against the vitreous framework structure to facilitate infiltration and to bring be the respective PTFE molecules as close as possible to the surface of the vitreous framework structure, so the intermolecular interactions which are responsible for wetting can become active.

The production of a three-dimensional molded body having a porous framework structure consisting of CPG, which is filled completely with a polymer-containing material, preferably PTFE, combines at least two advantages: first, it is possible to significantly reduce the quantity of very expensive PTFE material required in comparison with traditional methods in which sintering or machining of monoliths made of PTFE is performed, for example. The amount of reject material generated with the shaping process of the invention is much lower, so that significant quantities of PTFE material can be saved due to the presence of a CPG, which also acts as a filler. Furthermore, PTFE is fundamentally subject to the phenomenon of "cold flow," that is, a gradual change in shape takes place even at room temperature due to a creep behavior inherent in PTFE material. Due to the joint connection between the PTFE and the rigid inorganic structure consisting of CPGs, the shape of the three-dimensional molded article formed according to the present invention can be stabilized for the long term without any sacrifice in terms of the mechanical properties of the molded article in comparison with a molded article made entirely of PTFE.

The possibility of production of a strong cohesive coating on an inorganic surface using PTFE material has already been pointed out above.

In both cases, that is, in the production of three-dimensional molded bodies as well as in corresponding coatings of polymer-containing materials, it is possible to process polymers at lower temperatures than in traditional thermoplastic processing methods. For example, PEEK is processed at 450° C. in the state of the art. With the aid of the method of the invention, it is possible to process molded parts and coatings of PEEK at 360° C., which is, just above its melting point.

The invention claimed is:

1. The method of producing a three-dimensional body, including at least partial areas of a porous inorganic framework structure, which are completely filled with a polymer-containing material, comprising:
    completely filling the at least partial areas of the porous inorganic framework structure with the polymer-containing material being heated to a process temperature above a temperature at which the polymer-containing materials solidifies and below a process temperature at which the polymer containing material can be thermoplastically processed, to produce a connection between the polymer-containing material and the porous inorganic framework structure based on adhesive interactions, interfacial interactions, electrostatic interactions or a combination thereof.

2. The method for producing an adhesive bond between a polymer-containing material and a molded body having an inorganic porous framework structure in at least partial areas, comprising:
    providing the molded body having the inorganic porous framework structure in at least some surface areas, or introducing a porous structure into a surface of an inorganic surface of a molded body;
    applying a polymer-containing material to the inorganic porous framework structure of the molded body; and
    applying pressure to the polymer-containing material against the inorganic porous framework structure of the molded body to completely fill at least the partial areas by heating to a process temperature above a temperature at which the polymer-containing material solidifies and below a process temperature at which the polymer-containing material can be processed thermoplastically to form a joint connection between the polymer-containing material and the inorganic porous framework structure of the molded body based on adhesive interactions, interfacial interactions, electrostatic interactions or a combination thereof.

3. The method according to claim 1, wherein: the inorganic porous framework structure is formed with average pore sizes from 1 nm to 100 µm.

4. The method according to claim 2, wherein: the inorganic porous framework structure is formed with average pore sizes from 1 nm to 100 µm.

5. The method according to claim 1, wherein:
the inorganic porous framework structure is entirely or partially a material selected from metals, metal alloys, nonmetals, combinations of nonmetallic elements and metal-nonmetal composites.

6. The method of claim 5 wherein:
the material is platinum, palladium, copper, iron, oxides, phosphates, nitrides, mixtures of different oxides and/or phosphates and/or nitrides, semiconductor materials, amorphous carbon materials or at least partially crystalline carbon materials including silicon oxide, titanium oxide, aluminum oxide or boron nitride.

7. The method according to claim 2, wherein:
the inorganic porous framework structure is entirely or partially a material selected from metals, metal alloys, nonmetals, combinations of nonmetallic elements and metal-nonmetal composites.

8. The method of claim 7 wherein:
the material is platinum, palladium, copper, iron, oxides, phosphates, nitrides, mixtures of different oxides and/or phosphates and/or nitrides, semiconductor materials, amorphous carbon materials or at least partially crystalline carbon materials especially including silicon oxide, titanium oxide, aluminum oxide or boron nitride.

9. The method according to claim 1, wherein:
the inorganic porous framework structure is produced by using amphiphilic substances that influence the structure.

10. The method according to claim 2, wherein: the inorganic porous framework structure is produced by using amphiphilic substances that influence the structure.

11. The method according to claim 1, wherein:
the inorganic porous framework structure is produced by spinodal separation of a mixture.

12. The method according to claim 2, wherein:
the inorganic porous framework structure is produced by spinodal separation of a mixture.

13. The method according to claim 1, wherein:
the polymer-containing material is at least one polymer with an average molecular weight of more than 100,000 Da.

14. The method according to claim 2, wherein:
the polymer-containing material contains at least one polymer with an average molecular weight of more than 100,000 Da.

15. The method according to claim 1, wherein:
the polymer-containing material contains at least one polymer which is selected from:
i) organic polymers including poly(p-xylylene), poly-acrylamide, polyimides, polyesters, polyolefins, polystyrenes, polycarbonates, polyamides, polyethers, polyphenylenes, polysilanes, polysiloxanes, polybenzimidazoles, polybenzo-thiazoles, polyoxazoles, polysulfides, polyesteramides, polyarylene vinylenes, polylactides, polyether ketones, polyurethanes, polysulfones, polyacrylates, wholly aromatic copolyesters, poly-n-vinylpyrrolidone, polyhydroxyethyl meth-acrylate, polymethyl methacrylate, polyethylene terephthalate, polybutylene terephthalate, polymeth-acrylonitrile, polyvinyl acetate, neoprene, Buna N, polybutadiene, and homopolymers or copolymers thereof and/or blends thereof,
ii) inorganic polymers and copolymers and blends thereof with other hybrid polymers comprising organic and inorganic polymers,
iii) fluorinated polymers,
vi) polyethylenes,
v) biological polymers, modified or unmodified cellulose, alginates or polypeptides,
vi) polymers composed of at least two different repeating units, and
vii) combinations of organic and/or biological polymers.

16. The method according to claim 2, wherein:
the polymer-containing material contains at least one polymer which is selected from
i) organic polymers including poly(p-xylylene), poly-acrylamide, polyimides, polyesters, polyolefins, polystyrenes, polycarbonates, polyamides, polyethers, polyphenylenes, polysilanes, polysiloxanes, polybenzimidazoles, polybenzo-thiazoles, polyoxazoles, polysulfides, polyesteramides, polyarylene vinylenes, polylactides, polyether ketones, polyurethanes, polysulfones, polyacrylates, wholly aromatic copolyesters, poly-n-vinylpyrrolidone, polyhydroxyethyl meth-acrylate, polymethyl methacrylate, polyethylene terephthalate, polybutylene terephthalate, polymeth-acrylonitrile, polyvinyl acetate, neoprene, Buna N, polybutadiene, and homopolymers or copolymers thereof and/or blends thereof;
ii) inorganic polymers, polyphosphates and silicones and copolymers and blends thereof with other organic or inorganic polymers and hybrid polymers comprising organic and inorganic polymers;
iii) fluorinated polymers, including polyvinylidene fluoride, polytrifluoroethylene or polytetrafluoro-ethylene;
vi) polyethylenes;
v) biological polymers, modified or unmodified cellulose, alginates or poly-peptides,
vi) polymers composed of at least two different repeating units, and
vii) combinations of organic and/or biological polymers.

17. The method according claim 1, wherein:
the molded body having the inorganic porous framework structure in the at least partial areas is heated to the process temperature at least in partial areas while in contact with the polymer-containing material.

18. The method according claim 12, wherein:
the molded body having the inorganic porous framework structure in the at least partial areas is heated to the process temperature at least in partial areas while in contact with the polymer-containing material.

19. The method according to claim 1, comprising:
heating the molded body having the inorganic porous framework structure in at least partial areas to the process temperature in at least partial areas until pores of at least one partial area of the framework structure are completely filled with the polymer-containing material and cooling at least the inorganic porous framework structure of the molded body after reaching the completely filled state.

20. The method according to claim 2, comprising:

heating the molded body having an inorganic porous framework structure in at least partial areas to the process temperature in at least partial areas until pores of at least one partial area of the framework structure are completely filled with the polymer-containing material and cooling at least the inorganic porous framework structure of the molded body after reaching the completely filled state.

21. The method according to claim 2, wherein:

the polymer-containing material is applied to the inorganic porous framework structure of the molded body to form polymer-containing material layer of a surface coating on the inorganic porous framework structure or an adhesive bond is formed between the inorganic porous framework structure of the molded body and the molded body of the polymer-containing material.

22. The method according to claim 11, wherein the inorganic porous framework structure is produced in a form of controlled porous glasses with pore width of 2 nm to 120 nm.

23. The method according to claim 12, wherein the inorganic porous framework structure is produced in form of controlled porous glasses with pore width of 2 nm to 120 nm.

24. The method according to claim 15, wherein:

the inorganic polymers comprise polyphosphates and silicones and the hybrid polymers comprise organic and inorganic polymers;

the fluorinated polymers comprise polyvinylidene fluoride, polytrifluoroethylene, polytetrafluoro-ethylene; and the biological polymers includes polysaccharides and the polypeptides include collagen.

25. The method according to claim 2, wherein:

the inorganic polymers comprise polyphosphates and silicones and the hybrid polymers comprise organic and inorganic polymers;

the fluorinated polymers comprise polyvinylidene fluoride, polytrifluoroethylene, polytetrafluoro-ethylene; and the biological polymers includes polysaccharides and the polypeptides include collagen.

* * * * *